United States Patent [19]

Holm

[11] 4,022,699

[45] * May 10, 1977

[54] SOLUBLE OIL COMPOSITION

[75] Inventor: LeRoy W. Holm, Fullerton, Calif.

[73] Assignee: Union Oil Company of California, Brea, Calif.

[ * ] Notice: The portion of the term of this patent subsequent to Oct. 10, 1989, has been disclaimed.

[22] Filed: Nov. 22, 1974

[21] Appl. No.: 526,245

Related U.S. Application Data

[63] Continuation-in-part of Ser. No. 266,284, June 26, 1972, abandoned, which is a continuation-in-part of Ser. No. 889,640, Dec. 31, 1969, Pat. No. 3,697,424, which is a continuation-in-part of Ser. No. 713,496, March 15, 1968, Pat. No. 3,500,919.

[52] U.S. Cl. .......................... 252/8.55 D; 166/275; 252/309
[51] Int. Cl.² ..................... E21B 43/22; C09K 3/00
[58] Field of Search ............. 252/8.55 D, 308, 309; 166/273, 274, 275

[56] References Cited

UNITED STATES PATENTS

| | | | |
|---|---|---|---|
| 3,163,214 | 12/1964 | Csaszar | 252/8.55 X |
| 3,254,714 | 6/1966 | Gogarty et al. | 166/274 |
| 3,275,075 | 9/1966 | Gogarty et al. | 166/274 |
| 3,307,628 | 3/1967 | Sena | 166/274 X |
| 3,330,343 | 7/1967 | Tosch et al. | 252/8.55 X |
| 3,477,511 | 11/1969 | Jones et al. | 166/275 X |
| 3,497,006 | 2/1970 | Jones et al. | 166/273 |
| 3,687,201 | 8/1972 | Son et al. | 166/275 |
| 3,697,424 | 10/1972 | Holm | 252/8.55 |

*Primary Examiner*—Herbert B. Guynn
*Attorney, Agent, or Firm*—Richard C. Hartman; Dean Sandford; John E. Vanderburgh

[57] ABSTRACT

A soluble oil composition comprised of a liquid hydrocarbon, a preferentially oil-soluble surface active organic sulfonate, a preferentially water-soluble surface active organic sulfonate, and a stabilizing agent. The stabilizing agent can be a monohydric aliphatic alcohol containing 3 to 5 carbon atoms, a polyhydric aliphatic alcohol containing 3 carbon atoms, an aliphatic ketone containing 4 to 6 carbon atoms, a glycol ether containing 4 to 12 carbon atoms, or a dialkylene glycol containing 6 carbon atoms. The composition has particular utility as a displacement fluid in a flooding process for the recovery of oil, and for various well treating applications. The soluble oil composition can be substantially anhydrous, or it can contain water present as a water-in-oil microemulsion.

25 Claims, 1 Drawing Figure

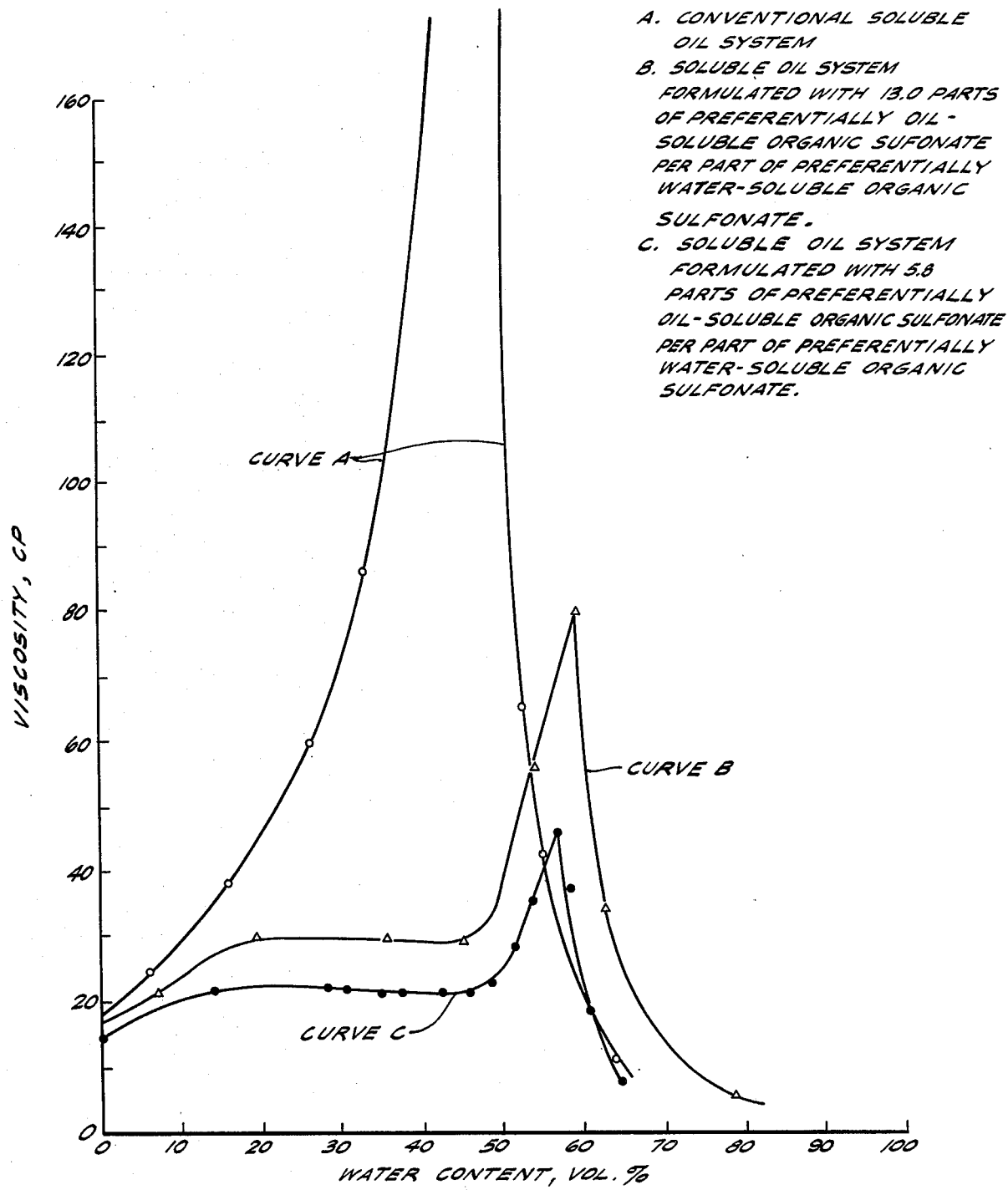

SOLUBLE OIL COMPOSITION

This is a continuation-in-part of application, Ser. No. 266,284, filed June 26, 1972, now abandoned, which is a continuation-in-part of application, Ser. No. 889,640, filed Dec. 31, 1969, now issued as U.S. Pat. No. 3,697,424, which is a continuation-in-part of application, Ser. No. 713,496, filed Mar. 15, 1968, and now issued as U.S. Pat. No. 3,500,919.

This invention relates to the recovery of oil from subterranean petroleum reservoirs, and more particularly to an improved displacement fluid composition for use in a flooding process for the recovery of petroleum.

It has long been recognized that substantial amounts of oil remain unrecovered in the reservoir at the completion of normal primary recovery operations. Hence, various secondary methods of recovering additional quantities of oil have been proposed, such as the well-known techniques of water flooding in which water is injected into the reservoir through an injection well to drive additional oil toward one or more production wells spaced apart in the reservoir from the injection well. Although an additional quantity of oil can often be recovered by waterflooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and extremely small droplets of water are dispersed therein.

Also, soluble oils are useful in various well treating processes, such as the treatment of water injection wells to improve water injectivity, to remove water blockage in producing wells, and in well cleaning operations.

It is well-known that soluble oils spontaneously absorb or "take-up" water when contacted therewith forming water-in-oil microemulsions, and that the viscosity of the soluble oil increases sharply as it takes up water. Water take-up by the soluble oil can occur both on the addition of water to the soluble oil prior to injection into the formation and on the injected soluble oil contacting water in the reservoir. Not only is difficulty experienced on injecting these high viscosity soluble oils and microemulsions into the reservoir, but more seriously, unfavorable mobility ratios exist in the reservoir between the viscous miscible displacement fluid and subsequently injected flood water causing excessive fingering of the dried fluid into the more viscous miscible displacement fluid.

Although various types of hydrocarbons have been suggested for the preparation of soluble oils, in most applications, both where the soluble oil is injected in the anhydrous form and as a microemulsion, economics favor preparation of the soluble oil from a petroleum crude oil which can be a crude oil previously produced from the reservoir to be treated, or which is otherwise conveniently available, or from other relatively viscous hydrocarbon fractions. However, the problem of viscosity increase on water take-up is particularly acute with these more viscous hydrocarbons and it has heretofore been necessary to use more costly, lower boiling hydrocarbons, such as gasoline and LPG, as the hydrocarbon base in the preparation of the soluble oils and microemulsions useful as displacement fluids, or to dilute the more viscous soluble oils and microemulsions with expensive solvents. Thus, need exists for an economical solvent system that has a mobility approximating the mobility of the reservoir oil, that does not greatly decrease in mobility on water take-up, and that effects high oil recovery when followed by a water drive.

Accordingly, it is a principal object of this invention to provide an improved displacement fluid for the recovery of petroleum from subterranean reservoirs.

Another object of the invention is to provide an improved displacement fluid suitable for injection into an oil-containing reservoir and subsequent displacement through the reservoir by flood water. Still another object of the invention is to provide an improved soluble oil composition for use in well treating operations.

Yet another object of the invention is to provide a soluble oil having a limited viscosity increase on taking up water.

A further object of the invention is to provide a soluble oil composition in which the viscosity is not greatly effected by the addition of water to the soluble oil. A yet further object of this invention is to provide a soluble oil concentrate for use in preparing soluble oil compositions.

Other objects and advantages will be apparent from the following description.

Briefly, this invention contemplates an improved soluble oil composition comprising a liquid hydrocarbon, a preferentially oil-soluble surface active organic sulfonate, a preferentially water-soluble surface active organic sulfonate, and a stabilizing agent, that is useful as a displacement fluid in a flooding process. The stabilizing agents are monohydric aliphatic alcohols containing 3 to 5 carbon atoms, dihydric aliphatic alcohols containing 3 carbon atoms, aliphatic ketones containing 4 to 6 carbon atoms, glycol ethers containing 4 to 12 carbon atoms, and dialkylene glycols containing 6 carbon atoms. In the flooding application, the composition is injected into the reservoir through an injection well and thereafter an aqueous flooding agent is injected to drive the soluble oil composition towards a spaced production well from which fluids are recovered. The soluble oil can be substantially anhydrous, or water can be present in the form of a water-in oil microemulsion. By substantially anhydrous it is meant that the soluble oil contains little, if any, added water. However, it is well-known that some of the ingredients from which soluble oils are compounded, such as the hydrocarbn, the stabilizing agent and the petroleum sulfonates, can contain minor amounts of water, and that it is difficult and costly to dehydrate these ingredients to remove all traces of water. Also, it may be advantageous when compounding the soluble oil to add a small amount of water to the composition. Thus, "substantially anhydrous" as used herein is meant to include soluble oils having not more than minor amounts of water, and more particularly containing less than about 10 volume percent of water. In either case, it has been found that soluble oils compounded in accordance with this invention are less affected by the addition of water than are the prior art soluble oils, that more water can be absorbed before inversion to oil-in-water emulsions, and that improved oil recovery is attained when the soluble oils are used in a flooding process.

The drawing graphically illustrates the variation in viscosity of a conventional soluble oil system and of soluble oil systems of the present invention as a function of the volume percent of water added to the soluble oil.

More specifically, this invention involves a flooding process in which oil is displaced from a subterranean oil-bearing reservoir by an improved soluble oil composition containing a mixture of surface active materials including both preferentially oil-soluble organic sulfonates and preferentially water-soluble organic sulfonates. In the practice of this invention, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front; such as the conventional "five-spot" pattern wherein a central producing well is surrounded by four somewhat symmetrically located injection wells. Another of the conventional flooding patterns that can be employed in the practice of this invention is the "line-drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, a preferentially oil-soluble surface active organic sulfonate, a preferentially water-soluble surface active organic sulfonate, and a stabilizing agent. The emulsions formed by the addition of water to a soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion as a displacement agent. Emulsions of this type are designated microemulsions to distinguish them from ordinary water-in-oil macroemulsions in which the lower limit of the size of the water droplets is about 0.1 micron. At water concentrations above the inversion concentration, the emulsion inverts to an oil-in-water emulsion in which droplets of oil are dispersed in a continuous water phase. It is preferred that the water concentrations of the soluble oils of this invention be maintained below the inversion concentration so as to prevent inversion to emulsions of the oil-in-water type.

One of the major constituents of the improved soluble oil composition of this invention is a liquid hydrocarbon, which can comprise crude petroleum, such as a crude oil previously recovered from the reservoir, or other conveniently available crude oil; or a petroleum fraction such as a refined or semi-refined petroleum product, such as gasoline, naphtha, stove oil, diesel and gas oil; a residual product obtained by the distillation of lower boiling fractions from a crude oil, such as bunker fuel oil and other residual products; a low value refinery by-product, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

The preferentially oil-soluble surfactant material is an oil-soluble, relatively water-insoluble surface active organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble surface active organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have average molecular weights of less than about 400 or which contain more than one sulfonic acid group per molecule, i.e., the preferred water-soluble sulfonates are monosulfonates or polysulfonates which in the form of their sodium salts have average equivalent weights of less than about 400. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has an average molecular weight above about 450, and preferably in the range of about 450 to 500.

Thus, the soluble oil compositions of this invention are prepared by admixing into the hydrocarbon a preferentially oil-soluble organic sulfonate, such as an alkyl aryl sulfonate or mixture of sulfonates which in the form of their sodium salts have average molecular weights of more than about 400, and a preferentially water-soluble organic sulfonate, such as an alkyl aryl monosulfonate or mixture of monosulfonates which in the form of their sodium salts have molecular weights of less than about 400 or such as polysulfonates having average equivalent weights of less than about 400. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500 and which includes both preferentially oil-soluble and preferentially water-soluble sulfonates.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 15 parts of oil-soluble agent per part of water soluble agent, or more preferably to about 12 parts of oil-soluble agent per part of water-soluble agent. That is, the soluble oil compositions of this invention contain between about 1 to 15, or 1 to 12 parts of preferentially oil-soluble sulfonate per part of preferentially water-soluble sulfonate. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers, and polyhydric alkyl ethers. More specifically, the stabilizing agents are monohydric aliphatic alcohols having 3 to 5 carbon atoms, dihydric aliphatic alcohols containing 3 carbon atoms, aliphatic ketones containing 4 to 6 carbon atoms, glycol ethers containing 4 to 12 carbon atoms, more particularly 4 to 10 carbon atoms, and dialkylene glycols containing 4 to 6 carbon atoms, and preferably 6 carbon atoms. Exemplary monohydric alcohols include isopropyl alcohol, n-butyl alcohol, isobutyl alcohol, secondary butyl alcohol, tertiary butyl alcohol, normal amyl alcohol and secondary amyl alcohol. Exemplary dihydric aliphatic alcohols include 1,3-propanediol and 1,2-propanediol. Exemplary aliphatic ketones include methyl ethyl ketone, diethyl ketone and methyl isobutyl ketone. Exemplary glycol ethers include ethylene glycol monoethyl ether (Cellosolve solvent), ethylene glycol monobutyl ether (butyl Cellosolve solvent), diethylene glycol monobutyl ethyl (butyl Carbitol solvent), diethylene glycol monoethyl ether (Carbitol solvent), diethylene glycol hexyl ether (hexyl Carbitol solvent), ethylene glycol hexyl ether (hexyl Cellosolve solvent) and hexyl glycol monohexyl ether (Cosurfactant 120). The terms "Cellosolve" and "Carbitol" are trademarks of the Union Carbide Corporation and "Cosurfactant 120" is a trademark of Amoco Chemical Company. An exemplary dialkylene glycol is dipropylene glycol. Specific agents found particularly useful include isopropyl alcohol, secondary butyl alcohol, methyl ethyl ketone, ethylene glycol monobutyl ether, diethylene glycol monobutyl ether, diethylene glycol hexyl ether, and hexyl glycol monohexyl ether.

It has been found that increased quantities of oil can be recovered from a subterranean petroleum reservoir by a flooding process utilizing a soluble oil containing both preferentially oil-soluble and preferentially water-soluble surface active materials than can be recovered by either conventional water flooding or by miscible water flooding with the prior art soluble oils formulated with oil-soluble organic sulfonates, or other conventional surface active materials. Also, the soluble oil compositions of this invention do not exhibit the large increase in viscosity on taking up water that are characteristic of the prior art soluble oil compositions. For example, with the soluble oil compositions of this invention, the peak viscosity at the inversion water concentration may be not more than about 5 times, and particularly not more than about 4 to 5 times the viscosity of the substantially anhydrous soluble oil. In contrast, the viscosity increase may be in excess of 50 to 100 fold with the prior art soluble oils. A further unexpected advangtage observed with the soluble compositions of this invention is that the inversion of the microemulsion from a water-in-oil emulsion to an oil-in-water emulsion occurs at a higher water content than experienced with the prior art soluble oils. Thus, the soluble oils of this invention will take up more water prior to inversion than will the prior are soluble oils.

The soluble oils useful in the practice of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material is added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 15,000 ppm, and more preferably less than about 5,000 ppm. Water-soluble salts of a monovalent metal can be added to obtain a water having a desired salt content.

The composition of this invention comprises a mixture of about 35 to 90 volume percent liquid hydrocarbon, and more preferably 45 to 90 volume percent liquid hydrocarbon, such as crude petroleum; 0.5 to 8 volume percent stabilizing agent, such as one of the above-described partially oxygenated organic liquids, or a mixture of these liquids; and 4 to 30 volume percent combined surface active materials containing both preferentially oil-soluble and preferentially water-soluble organic sulfonates in the previously disclosed proportions. This composition can also contain water present as a water-in-oil microemulsion in an amount up to that amount causing inversion to an oil-in-water emulsion. The soluble oil compositions of the invention can also comprise about 45 to 75 volume percent liquid hydrocarbon, 3 to 8 volume percent stabilizing agent, 8 to 30 volume percent combined surface active materials containing both preferentially oil and water-soluble organic sulfonate surface active materials in the previously disclosed proportions, and 0 to 40 percent water. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than 25 percent by volume of the resulting soluble oil.

Also, an additive concentrate can be prepared by admixing (1) preferentially oil-soluble surface active alkyl aryl sulfonates and preferentially water-soluble surface active alkyl aryl sulfonates in the proportion of about 1 to 15 and more preferably about 1 to 12 parts of preferentially oil-soluble sulfonates per part of preferentially water-soluble sulfonate, and (2) an organic liquid stabilizing agent in the proportion of about 2 to 7 parts by volume of said sulfonates per part of said stabilzing agent. The sulfonate and stabilizing agents are those previously described. A soluble oil can be prepared from the additive concentrate by adding the additive concentrate to a liquid hydrocarbon, in the proper proportions. Also, water, a water-soluble salt of a monovalent metal, and light liquid hydrocarbon optionally can be added to the soluble oil.

In the flooding operation, the soluble oil prepared in the foregoing manner is then injected into the reservoir through one or more injection wells in an amount sufficient to establish in the reservoir a bank which can be displaced through the reservoir. Satisfactory oil recoveries can usually be obtained by the injection of 0.01 to 0.15 reservoir pore volumes of soluble oil. Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide. In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter, water or brine is injected to drive the previously injected fluids toward at least one spaced production well.

The invention is further illustrated by the following examples which are illustrative of specific modes of practicing the invention and are not intended as limiting the scope of the invention as defined by the appended claims.

EXAMPLE 1

The improved viscosity characteristic of the soluble oil composition of this invention is demonstrated by the following tests. A first substantially anhydrous soluble oil composition is prepared in accordance with the prior art by admixing 72 volume percent 39° API Illinois crude oil, 6.7 volume percent of butyl Cellosolve and 21.3 volume percent of a surface-active agent marketed by the Sonneborn Division of Witco Chemical Company, Inc. under the trademark Petronate CR. Petronate CR is an oil solution containing about 62 percent of preferentially oil-soluble alkyl aryl sulfonates having an average molecular weight in the range of 490–510, and up to about 5 percent water. Tap water containing about 700 ppm dissolved salts is then added to the soluble oil in incremental portions and the appearance of the resulting microemulsion is observed at each increment and its viscosity measured with a Brookfield viscosimeter equipped with a UL adapter and operated at a speed of 6 rpm. These data are reported in Table 1 and are illustrated in the drawing by curve A which shows the variation in viscosity as a function of water addition.

A second soluble oil composition in accordance with this invention is prepared by admixing 72.1 volume percent 39° API Illinois crude oil, 6.7 volume percent butyl Cellosolve, 18.3 volume percent Petronate Cr, and 2.9 volume percent of a preferentially water-soluble surface-active agent marketed by the Sonneborn Division of Witco Chemical Company, Inc. under the trademark Pyronate 30. Pyronate 30 is an aqueous solution containing 30 percent preferentially water-soluble petroleum sulfonates having an average molecular weight in the range of 330 to 350. The Pyronate 30 also contains about 10 percent mineral oil and about 10 percent inorganic salts. The ratio of preferentially oil-soluble active agent to preferentially water-soluble active agent is about 13.0 to 1. As before, water is incrementally added and the appearance and viscosity of the resulting microemulsion determined at each increment of water addition. These data are reported in Table 1 and are illustrated in the drawing by curve B.

A third soluble oil composition in accordance with this invention is prepared by admixing 70.9 volume percent Illinois crude oil, 6.6 volume percent butyl Cellosolve, 16.6 volume percent Petronate CR, and 5.9 volume percent Pyronate 30. The ratio of preferentially oil-soluble active agent to preferentially water-soluble active agent is about 5.8 to 1. As before, water is incrementally added and the appearance and viscosity of the resulting microemulsion determined at each increment of water addition. These data are reported in Table 1 and are illustrated in the drawing by curve C.

It is apparent from this data that the soluble oil compounded with both oil and water-soluble organic sulfonate surface-active agents exhibits a markedly different viscosity relationship on taking up water than does the soluble oil compounded with a single surface-active agent. On the addition of water to soluble oil compounded with a single surface-active agent, a water-in-oil microemulsion is formed. The viscosity of the microemulsion increased to a value in excess of 1200 cp, and the microemulsion is transformed into a gelatinous mass by the addition of about 49 percent water. On the continued addition of water, the microemulsion is inverted to an oil-in-water emulsion. Similarly, a water-in-oil microemulsion is formed on the addition of water to soluble oils containing both oil and water-soluble surface-active organic sulfonates. In the case of the soluble oil containing 13.0 parts of preferentially oil-soluble surface active sulfonate per part of preferentially water-soluble sulfonate, the viscosity of the resulting microemulsion is increased to a peak of 79 cp at about 60 percent water addition, whereupon the microemulsion is inverted to an oil-in-water emulsion. The maximum viscosity at the inversion point is further reduced to 45.8 cp with the soluble oil containing the more optimum ratio of 5.8 parts of preferentially oil-soluble sulfonate per part of preferentially water-soluble sulfonate. With the soluble oil compounded with a single surface-active agent, a viscosity of 79 cp corresponds to about 30 volume percent of added water, and a viscosity of 45.6 cp to about 20 volume percent of added water. Also, the volume percent of added water at inversion is increased from about 49 percent to about 60 percent. Another advantage of the soluble oils of this invention is that the viscosity increase is small up to about 50 volume percent of added water. Thus, compounding the soluble oil with the preferred combination of surface-active organic sulfonates results in a marked reduction in the maximum viscosity encountered on the addition of water and increases the amount of water that can be absorbed prior to inversion.

TABLE 1

EFFECT OF WATER ON SOLUBLE OIL STABILITY AND VISCOSITY

Soluble Oil Prepared with a Single Surfactant

| Water Added Vol.% | Viscosity, cp | Emulsion Type | Appearance |
| --- | --- | --- | --- |
| 0 | 18 | w/o | Clear |
| 6.25 | 25 | w/o | Clear |
| 16.7 | 38 | w/o | Clear |
| 25 | 60 | w/o | Clear |
| 33.6 | 87 | w/o | Cloudy |
| 38 | 1200 | w/o | Thick |
| 49 | gel | — | Thick |
| 53 | 65 | o/w | Cloudy |
| 64 | 11 | o/w | Cloudy |

Soluble Oil Prepared with a Surfactant Combination Containing 13.0 Parts of Preferentially Oil-Soluble Organic Sulfonate per Part of Preferentially Water-Soluble Organic Sulfonate

| Water Added Vol.% | Viscosity, cp | Emulsion Type | Appearance |
| --- | --- | --- | --- |
| 0 | 17 | w/o | Clear |
| 7.4 | 22 | w/o | Clear |
| 19.4 | 31 | w/o | Clear |
| 35.9 | 30 | w/o | Clear |
| 45.6 | 29 | w/o | Clear |
| 55 | 56 | w/o | Clear |
| 60 | 79 | — | Clear |
| 63 | 34 | o/w | Cloudy |
| 79 | 5 | o/w | Cloudy |

Soluble Oil Prepared with a Surfactant Combination Containing 5.8 Parts of Preferentially Oil-Soluble Organic Sulfonate Per Part of Preferentially Water-Soluble Organic Sulfonate

| Water Added Vol.% | Viscosity, cp | Emulsion Type | Appearance |
| --- | --- | --- | --- |
| 0 | 14.9 | w/o | Clear |
| 7.4 | 20.5 | w/o | Clear |
| 13.8 | 22.4 | w/o | Clear |
| 28.6 | 22.8 | w/o | Clear |
| 31.0 | 22.0 | w/o | Clear |
| 35.5 | 21.8 | w/o | Clear |
| 39.4 | 21.6 | w/o | Clear |
| 42.9 | 21.8 | w/o | Clear |
| 46.0 | 22.7 | w/o | Clear |
| 48.7 | 23.7 | w/o | Clear |
| 51.3 | 28.7 | w/o | Clear |
| 53.5 | 35.5 | w/o | Clear |
| 55.6 | 42.7 | w/o | Clear |
| 57.5 | 45.8 | — | Clear |
| 59.2 | 37.5 | o/w | Cloudy |
| 61.6 | 19.0 | o/w | Cloudy |
| 65.0 | 9.2 | o/w | Cloudy |

EXAMPLE 2

A series of tests is conducted to illustrate the improved viscosity characteristics of the microemulsions formed by the addition of water to various soluble oil compositions formulated with both preferentially oil-soluble and preferentially water-soluble alkyl aryl sulfonates and selected stabilizing agents. Soluble oil compositions 2A through 2I were prepared in accordance with the prior art by admixing a crude oil, preferentially water-soluble surface active agents, preferentially oil-soluble surface active agents, and a selected stabilizing agent. Water is added in incremental portions to each substantially anhydrous soluble oil composition and the appearance of the resulting microemulsion is observed at each increment and its viscosity is measured with a Brookfield viscosimeter. The composition of the nine soluble oils and the data obtained is reported in Table 2.

TABLE 2

EFFECT OF WATER ADDITION ON SOLUBLE OIL VISCOSITY

Soluble Oil 2A

| | Composition Vol.% |
|---|---|
| Higgs Crude oil[1] | 78.9 |
| Petronate CR[2] | 11.2 |
| Pyronate 30[3] | 7.9 |
| Isopropyl alcohol | 2.0 |
| Ratio o.s/w.s sulfonates 2.93[4] | |
| Water added: tap water | |

| Water Added Vol.% | Viscosity, cp |
|---|---|
| 0.0 | 10.0 |
| 7.0 | 12.5 |
| 13 | 13.7 |
| 20 | 16.3 |
| 26 | 17.6 |
| 33.3 | 26.6 |
| 38.5 | 36.6 |
| 44.4 | 25.2 |
| 50 | 12.8 |
| 55.6 | 6.4 |
| 60 | 5.2 |
| 65.5 | 3.8 |
| 70.6 | 3.2 |

Soluble Oil 2B

| | Composition Vol.% |
|---|---|
| Higgs crude oil | 72 |
| Petronate CR | 11.2 |
| Pyronate 30 | 7.9 |
| Sec-butyl alcohol | 2.0 |
| Ratio o.s/w.s sulfonates 2.93 | |
| Water added: tap water | |

| Water Added Vol.% | Viscosity, cp |
|---|---|
| 0 | 10.1 |
| 7 | 14.8 |
| 13 | 18.2 |
| 20 | 16.1 |
| 26 | 13.7 |
| 33.3 | 14.4 |
| 38.5 | 21.3 |
| 44.4 | 30.4 |
| 50 | 13.5 |
| 55.6 | 7.1 |
| 60 | 4.8 |
| 65.5 | 3.7 |
| 70.6 | 3.5 |

Soluble Oil 2C

| | Composition Vol.% |
|---|---|
| Illinois crude oil[5] | 78.7 |
| Petronate RHL[6] | 11.8 |
| Pyronate 30 | 7.5 |
| n-amyl alcohol | 2.0 |
| Ratio o.s/w.s sulfonates 3.14 | |
| Water added: tap water | |

| Water Added Vol.% | Viscosity, cp |
|---|---|
| 0 | 10.0 |
| 3.9 | 13.2 |
| 7.4 | 17.1 |
| 10.7 | 21.3 |
| 16.7 | 27.4 |
| 21.9 | 34.2 |
| 28.6 | 33.0 |
| 34.2 | 26.2 |
| 39.0 | 20.2 |
| 44.0 | 23.0 |
| 50.0 | 36.6 |
| 54.6 | 14.8 |
| 61.5 | 5.2 |
| 66.7 | 4.4 |
| 72.0 | 4.0 |
| 75.0 | 3.6 |
| 80.0 | 3.2 |

Soluble Oil 2D

| | Composition Vol.% |
|---|---|
| Moulton crude oil[7] | 74.7 |
| Petronate TRS-HMW[8] | 9.2 |
| Petronate L[9] | 2.42 |
| Pyronate 40[10] | 6.16 |
| Distilled water | 2.02 |
| Methyl ethyl ketone | 5.5 |
| Ratio o.s/w.s sulfonates 2.82 | |
| Water added: synthetic tap water[11] | |

| Water Added Vol.% | Viscosity, cp |
|---|---|
| 0 | 9.5 |
| 3.9 | 22.2 |
| 7.4 | 28.8 |
| 10.7 | 33.0 |
| 16.7 | 33.7 |
| 21.9 | 34.2 |
| 28.6 | 53.7 |
| 34.2 | 36.6 |
| 39.0 | 27.5 |
| 44.0 | 25.2 |
| 50 | 25.8 |
| 54.6 | 49.4 |
| 61.5 | 18.0 |
| 72.0 | 6.5 |
| 80 | 4.1 |

Soluble Oil 2E

| | Composition Vol.% |
|---|---|
| Moulton crude oil | 71.3 |
| Petronate RHL | 10.7 |
| Pyronate 30 | 11.3 |
| Methyl isobutyl ketone | 6.7 |
| Ratio o.s/w.s sulfonates 1.92 | |
| Water added: synthetic tap water plus 5000 ppm NaCl | |

| Water Added Vol.% | Viscosity, cp |
|---|---|
| 0 | 13.8 |
| 4.3 | 24.3 |
| 8.2 | 37.3 |
| 11.7 | 67.6 |
| 18.2 | 67.8 |
| 23.7 | 56.2 |
| 30.8 | 47.0 |
| 36.6 | 45.5 |
| 41.6 | 18.6 |
| 47.1 | 15.3 |
| 52.6 | 54.0 |
| 57.1 | 48.0 |
| 64.0 | 18.5 |
| 69.0 | 8.7 |
| 74.3 | 7.0 |
| 81.6 | 3.5 |

Soluble Oil 2F

| | Composition Vol.% |
|---|---|
| Moulton crude oil | 74 |
| Petronate TRS-HMW | 9.06 |
| Petronate L | 2.38 |
| Pyronate 40 | 6.07 |
| Distilled Water | 1.99 |
| Ethylene glycol monoethyl ether | 6.5 |
| Ratio o.s/w.s sulfonates 2.84 | |
| Water added: synthetic tap water | |

| Water Added Vol.% | Viscosity, cp |
|---|---|
| 0 | 12.7 |
| 3.9 | 13.5 |
| 7.4 | 19.2 |
| 10.7 | 19.3 |
| 16.7 | 23.3 |
| 21.9 | 24.7 |
| 28.6 | 26.5 |
| 34.2 | 26.5 |
| 39.0 | 29.2 |

TABLE 2-continued
EFFECT OF WATER ADDITION ON SOLUBLE OIL VISCOSITY

| 44.0 | 18.3 |
| 50 | 16.2 |
| 54.6 | 17.3 |
| 61.5 | 40 |
| 72.0 | 15.2 |
| 80 | 6.5 |

Soluble Oil 2G

| | Composition Vol.% |
|---|---|
| Kansas crude oil[12] | 78 |
| Petronate TRS-12B[13] | 19.3 |
| Ethylene glycol monobutyl ether | 2.7 |
| Ratio o.s/w.s sulfonates 3.68 | |
| Water added: Murray Fresh water[14] plus 8000 ppm NaCl | |

| Water Added Vol.% | Viscosity, cp |
|---|---|
| 0 | 24.3 |
| 3.9 | 32.9 |
| 7.4 | 42.6 |
| 10.7 | 45.8 |
| 16.1 | 40.6 |
| 21.9 | 36.6 |
| 28.6 | 30.4 |
| 34.2 | 27.8 |
| 39.0 | 26.1 |
| 44.0 | 24.7 |
| 50.0 | 23.8 |
| 54.6 | 23.6 |
| 61.5 | 22.9 |
| 66.7 | 22.2 |
| 72.0 | 20.3 |
| 75.0 | 15.7 |
| 80.0 | 9.5 |

Soluble Oil 2H

| | Composition Vol.% |
|---|---|
| Moulton crude oil | 72.4 |
| Petronate RHL | 11.0 |
| Pyronate 30 | 9.5 |
| Diethylene glycol hexyl ether | 7.1 |
| Ratio o.s/w.s sulfonates 2.32 | |
| Water added: Synthetic tap water plus 2500 ppm NaCl | |

| Water Added Vol.% | Viscosity, cp |
|---|---|
| 0 | 11.5 |
| 4.8 | 15.2 |
| 9.1 | 19.0 |
| 13.0 | 22.7 |
| 20 | 27.4 |
| 25.9 | 28.2 |
| 33.3 | 24.8 |
| 39.4 | 20.4 |
| 44.4 | 15.9 |
| 50 | 15.2 |
| 55.6 | 17.7 |
| 60 | 25.2 |
| 66.7 | 13.8 |
| 71.5 | 4.4 |
| 80 | 3.2 |

Soluble Oil 2I

| | Composition Vol.% |
|---|---|
| Moulton crude oil | 78 |
| Petronate TRS-HMW | 10.0 |
| Petronate L | 2.6 |
| Pyronate 40 | 6.7 |
| Hexyl glycol monohexyl ether | 2.7 |
| Ratio o.s/w.s sulfonates 2.84 | |
| Water added: Moulton produced water[15] | |

| Water Added Vol.% | Viscosity, cp |
|---|---|
| 0 | 10.7 |
| 3.9 | 19.4 |
| 7.4 | 27.6 |
| 10.7 | 33.8 |
| 16.7 | 44.5 |
| 21.9 | 47.4 |
| 28.6 | 44.9 |
| 34.2 | 36.8 |
| 39.0 | 30.7 |
| 44.0 | 25.9 |
| 50.0 | 19.7 |
| 54.6 | 20.8 |
| 66.7 | 30.8 |
| 72 | 18.9 |
| 75 | 11.0 |

[1]Higgs crude oil is a 37° API Texas crude oil.
[2]Petronate CR sulfonate is an oil solution containing 62 percent preferentially oil-soluble alkyl aryl sulfonates having an average molecular weight in the range of about 490–510, and is marketed by the Sonneborn Division of Witco Chemical Company.
[3]Pyronate 30 sulfonate is an aqueous solution containing 30 percent preferentially water-soluble alkyl aryl sulfonates having an average molecular weight in the range of about 330 to 350 and is marketed by the Sonneborn Division of Witco Chemical Company.
[4]The ratio o.s/w.s sulfonates is the volumetric ratio of active preferentially oil-soluble sulfonates to active preferentially water-soluble sulfonates.
[5]Illinois crude oil is a 39° API crude oil.
[6]Petronate RHL sulfonate is an oil solution containing 60 percent preferentially oil-soluble sulfonates having an average molecular weight of between 490–510, and is marketed by the Sonneborn Division of Witco Chemical Company.
[7]Moulton crude oil is a 40.7° API Montana crude oil.
[8]Petronate TRS-HMW sulfonate is an oil solution containing 60 percent preferentially oil-soluble sulfonates having an average molecular weight of about 537, and is marketed by the Sonneborn Division of Witco Chemical Company.
[9]Petronate L sulfonate is an oil solution containing 62 percent preferentially oil-soluble sulfonates having an average molecular weight of 420; and is marketed by the Sonneborn Division of Witco Chemical Company.
[10]Pyronate 40 sulfonate is an oil solution containing 40 percent preferentially water-soluble sulfonates having an average molecular weight in the range of about 330 to 350 and is marketed by the Sonneborn Division of Witco Chemical Company.
[11]Synthetic tap water is distilled water containing 330 ppm of NaCl, 170 ppm of $CaCl_2$, and 30 ppm of $MgCl_2$.
[12]Kansas crude oil is a 37° API crude oil.
[13]Petronate TRS-12B sulfonate is a solution containing 48.8 volume percent preferentially oil-soluble sulfonates, 13.2 volume percent of preferentially water-soluble sulfonates, 15 volume percent mineral oil, 19.5 volume percent water, and 3.5 volume percent inorganic salt having an average molecular weight of about 410, and is marketed by the Sonneborn Division of Witco Chemical Company.
[14]Murray fresh water is a connate reservoir water from a Kansas oil field.
[15]Moulton produced water is a connate reservoir water from a Montana oil field.

From the data in Table 2, it is shown that the nine soluble oil compositions exhibit a maximum viscosity upon the addition of water thereto of not greater than about five times the viscosity of the soluble oil at 0 volume percent added water. It is also observed that the soluble oil compositions form stable microemulsions at all water concentrations and that they do not form cloudy solutions or separate into two phases at any water concentration.

EXAMPLE 3

A series of tests are conducted to illustrate the improved viscosity characteristics of the microemulsions formed by the addition of water to a soluble oil formulated with both preferentially oil-soluble and preferentially water-soluble alkyl aryl sulfonates stabilized with a stabilizing agent as compared with emulsions formed by adding water to a similar soluble oil with no stabilizer. The composition of the two soluble oils are as follows:

| | Composition Vol.% | |
|---|---|---|
| | 3A | 3B |
| Crude petroleum | 78.9 | 78.9 |
| Ethylene glycol monobutyl ether | 0 | 2.0 |
| Petronate CR | 12.3 | 11.2 |
| Pyronate 30 | 8.8 | 7.9 |
| Ratio o.s/w.s sulfonates | 2.9 | 2.9 |

Tap water containing about 700 ppm dissolved salts is then added to each soluble oil in incremental amounts and the appearance and viscosity of the resulting microemulsions are determined after each incremental addition. The data obtained is reported in Table 3.

Table 3

PROPERTIES OF MICROEMULSIONS FORMED BY ADDING WATER TO STABILIZED AND UNSTABILIZED SOLUBLE OILS

Soluble Oil 3A (Unstabilized)

| Water Added, Vol. % | Viscosity cp | Emulsion Type | Appearance |
|---|---|---|---|
| 0 | 23.9 | — | Clear, stable microemulsion |
| 7.4 | 38.1 | w/o | " |
| 13.8 | 90.4 | w/o | " |
| 20.6 | 332 | w/o | " |
| 26.5 | >500 | w/o | " |
| 32.4 | >600 | w/o | " |
| 37.5 | >700 | w/o | " |
| 44.5 | >500 | w/o | " |
| 50.0 | >400 | w/o | " |
| 54.5 | >400 | w/o | " |
| 60.3 | 84 | o/w | " |
| 65.7 | 33.8 | o/w | " |
| 70.3 | 17.8 | o/w | " |

SOLUBLE OIL 3B (Stabilized)

| Water Added, Vol. % | Viscosity, cp | Emulsion Type | Appearance |
|---|---|---|---|
| 0 | 20.1 | — | Clear, stable microemulsion |
| 7.4 | 32.4 | w/o | " |
| 13.8 | 39.7 | w/o | " |
| 20.6 | 51.4 | w/o | " |
| 26.5 | 63.8 | w/o | " |
| 32.4 | 59.2 | w/o | " |
| 37.5 | 43.7 | w/o | " |
| 44.5 | 34.4 | w/o | " |
| 50.0 | 29.4 | w/o | " |
| 54.5 | 60.7 | w/o | " |
| 60.3 | 25.8 | o/w | " |
| 65.7 | 6.7 | o/w | " |
| 70.3 | 5.4 | o/w | " |

This data illustrates that soluble oil 3A forms microemulsions upon the addition of water that exhibit viscosities almost 30 times the viscosity of the soluble oil before the addition of water thereto; whereas the microemulsions which form by adding water to the stabilized soluble 3B exhibit a maximum viscosity of about 3 times the initial viscosity of the soluble oil.

EXAMPLE 4

A number of substantially identical test cores 6 feet long by 1½ inches in diameter are prepared by packing Lucite tubes with Nevada 130 sand. The cores are first saturated with brine and then with an Iallinois crude oil having a gravity of 39° API. The cores are then flooded with brine to residual oil saturation. The improved oil recovery obtainable with the soluble oil compositions of this invention is demonstrated by the following tests which simulate a tertiary recovery operation on an oil reservoir previously subjected to water flooding.

The recovery obtainable by flooding with a prior art soluble oil composition is determined by injecting 0.025 pore volume of soluble oil in the form of a water-in-oil microemulsion into a first test core containing 29.3 percent residual oil. The microemulsion is prepared by admixing 69.2 volume percent Illinois crude oil, 6.4 volume percent butyl Cellosolve, 20.4 volume percent of preferentially oil-soluble surface-active agent marketed by the Sonneborn Division of Witco Chemical Company, Inc, under the trademark Petronate CR, and 4.0 volume percent tap water. Petronate CR is an oil solution containing about 62 percent of preferentially oil-soluble alkyl aryl sulfonates having an average molecular weight in the range of 490–510 and up to about 5 percent water. The microemulsion is driven through the core by the injection of 0.40 pore volume of an aqueous flooding medium thickened by the addition of 0.2 weight percent of a partially hydrolyzed polyacrylamide marketed by the Dow Chemical Company under the trademark Pusher 500, and then by brine. The recovered oil is accumulated and its volume measured. The ultimate oil recovery is 83.8 percent of the residual oil-in-place exclusive of the amount of soluble oil injected.

As second core containing 28.0 percent residual oil is similarly treated with 0.025 pore volume of a microemulsion composition in accordance with this invention prepared by admixing 69.2 volume percent of 39° API Illinois crude oil, 6.4 volume percent butyl Cellosolve, 17.6 percent Petronate CR, 2.8 volume percent of a water-soluble surface-active agent marketed by the Sonneborn Division of Witco Chemical Company, Inc. under the trademark Pyronate 30, and 4.0 volume percent tap water. Pyronate 30 is an aqueous solution containing 30 percent preferentially water-soluble petroleum sulfonates having an average molecular weight in the range of 330 to 350, about 10 percent mineral oil and about 10 percent inorganic salts. The ratio of preferentially oil-soluble surface-active agent to preferentially water-soluble agent is about 13.0 to 1. As before, the microemulsion is driven through the core by the injection of 0.40 pore volume of an aqueous flooding medium thickened by the addition of 0.2 weight percent of Pusher 500 and then by brine. The ultimate oil recovery is 84.5 percent of the residual oil-in-place, exclusive of the amount of soluble oil injected.

A third core containing 24.3 percent residual oil is treated with 0.025 pore volume of a more optimum microemulsion composition. This microemulsion is prepared by admixing 69.2 volume percent Illinois crude oil, 6.4 volume percent butyl Cellosolve, 11.7 volume percent Petronate CR, 8.7 volume percent Pyronate 30, and 4.0 volume percent tap water. The ratio of surface-active agents ia about 2.8 parts of preferentially oil-soluble agent per part of preferentially water-soluble agent. The microemulsion is displaced through the core by the injection of 0.40 pore volume of an aqueous flooding medium thickened by the addition of 0.2 weight percent of Pusher 500, and then by brine. The ultimate oil recovery is 88.3 percent of the residual oil-in-place, exclusive of the amount of soluble oil injected.

Thus, it is apparent that oil recovery can be improved even in a tertiary recovery operation by flooding with a soluble oil containing both preferentially oil-soluble surface-active organic sulfonates and preferentially water-soluble surface-active organic sulfonates. The results of these tests are summarized in Table 4.

TABLE 4

| Run No. | Microemulsion Composition, Volume % | Ratio of Oil-Soluble/Water-Soluble Surface-Active Agent | Microemulsion Slug Size Pore Volume | Initial Core Saturation %Oil %Water | | Ultimate Oil Recovery %Oil-in-Place |
|---|---|---|---|---|---|---|
| 1 | 69.2 Illinois Crude Oil<br>6.4 Butyl Cellosolve<br>20.4 Petronate CR | — | 0.025 | 29.3 | 70.7 | 83.8 |

TABLE 4-continued

| Run No. | Microemulsion Composition, Volume % | Ratio of Oil-Soluble/Water-Soluble Surface-Active Agent | Microemulsion Slug Size Pore Volume | Initial Core Saturation %Oil | %Water | Ultimate Oil Recovery %Oil-in-Place |
|---|---|---|---|---|---|---|
| | 4.0 Water | | | | | |
| 2 | 69.2 Illinois Crude Oil | 13.0 | 0.025 | 28.0 | 72.0 | 84.5 |
| | 6.4 Butyl Cellosolve | | | | | |
| | 17.6 Petronate CR | | | | | |
| | 2.8 Pyronate 30 | | | | | |
| | 4.0 Water | | | | | |
| 3 | 69.2 Illinois Crude Oil | 2.8 | 0.025 | 24.3 | 75.6 | 88.0 |
| | 6.4 Butyl Cellosolve | | | | | |
| | 11.7 Petronate CR | | | | | |
| | 8.7 Pyronate 30 | | | | | |
| | 4.0 Water | | | | | |

EXAMPLE 5

A flooding operation is conducted on an oil-containing reservoir in accordance with the method of this invention. Four injection wells are arranged in a rectangular pattern around a single centrally located production well. A displacement fluid comprising a microemulsion prepared by admixing 50 percent previously recovered crude oil, 5 percent isopropyl alcohol, 10 percent gasoline, 10 percent preferentially oil-soluble alkyl aryl sulfonate, 5 percent preferentially water-soluble alkyl aryl sulfonate, and 20 percent water. The microemulsion is injected into each of the injection wells at injection rates of about 35 barrels per day until a total amount of microemulsion equivalent to about 0.10 reservoir pore volume is injected. Thereafter, aqueous flooding medium is injected into the reservoir through each of the injection wells and petroleum and other produced fluids are recovered from the central producing well.

EXAMPLE 6

A flooding operation similar to that described in Example 5 is conducted in which a substantially anhydrous soluble oil is injected into formation and driven therethrough by a subsequently injected aqueous flooding medium. The soluble oil is prepared by admixing 70 percent previously recovered crude oil, 7.0 percent butyl Cellosolve, and 23 percent of mixed alkyl aryl sulfonates having an average molecular weight of about 450 and containing both preferentially oil-soluble and preferentially water-soluble sulfonates.

EXAMPLE 7

Compositions prepared by admixing

| | Composition, Vol. % | | | | |
|---|---|---|---|---|---|
| | 7-A | 7-B | 7-C | 7-D | 7-E |
| Crude petroleum | 69.2 | 69.1 | 69.2 | 69.3 | 69.2 |
| Butyl Cellosolve | 6.4 | 6.4 | 6.4 | 3.8 | 6.4 |
| Combined sulfonate[1] | 20.4 | 20.5 | 20.4 | 23.1 | 20.4 |
| Water[2] | 4.0 | 4.0 | 4.0 | 3.8 | 4.0 |
| Ratio[3] | 12.0 | 5.2 | 2.8 | 4.2 | 1.0 |

[1]An admixture of preferentially oil-soluble organic sulfonates having molecular weights in the range of 490–510 containing about 62% sulfonate and preferentially water-soluble organic sulfonates having molecular weights in the range of 330–350 containing about 30 percent sulfonates.
[2]Water contains about 700 ppm dissolved salts.
[3]Ratio of the parts by volume of preferentially oil-soluble sulfonate per part of preferentially water-soluble sulfonate.

EXAMPLE 8

A composition formed by admixing

| | Composition Vol. % |
|---|---|
| 37° API Texas crude oil | 81.5 |
| Secondary butyl alcohol | 2.0 |
| Combined sulfonates[1] | 16.5 |
| Ratio[2] | 2.1 |

[1]An admixture of preferentially oil-soluble organic sulfonates having molecular weights in the range of 500–520 containing about 62% sulfonate and preferentially water-soluble organic sulfonates having molecular weights in the range of 330–350 containing about 30 percent sulfonates.
[2]Ratio of the parts by volume of preferentially oil-soluble sulfonate per part by volume of preferentially water-soluble sulfonate.

EXAMPLE 9

A composition formed by admixing

| | Composition Vol. % |
|---|---|
| Gas Oil | 76.1 |
| Combined sulfonate[1] | 17.2 |
| Butyl Cellosolve | 1.8 |
| Water | 4.9 |
| Ratio[2] | 3.2 |

[1]An admixture of preferentially oil-soluble organic sulfonates having molecular weights in the range of 500–520, containing 62% sulfonates and preferentially water-soluble organic sulfonates having molecular weights in the range of 330–350 containing about 30% sulfonates.
[2]Ratio of the parts by volume of preferentially oil-soluble sulfonate per part of preferentially water-soluble sulfonate.

EXAMPLE 10

The compositions formed by admixing

| | Composition Volume % | | |
|---|---|---|---|
| | 10A | 10B | 10C |
| Crude petroleum | 73.6 | 74.2 | 74.0 |
| Methyl ethyl ketone | 3.1 | — | — |
| Carbitol | — | 3.0 | — |
| Butyl Carbital | — | — | 3.0 |
| Combined sulfonate[1] | 21.6 | 21.7 | 22.0 |
| Water | 1.7 | 1.1 | 1.0 |
| Ratio[2] | 11.5 | 11.6 | 11.6 |

[1]An admixture of preferentially oil-soluble alkyl aryl sulfonates having molecular weights in the range of 490–510 containing about 62% sulfonates and preferentially water-soluble sulfonates having molecular weights in the range of 330–350 containing about 30 percent sulfonates.
[2]Ratio of the parts by volume of preferentially oil-soluble sulfonate per part of preferentially water-soluble sulfonate.

EXAMPLE 11

The composition formed by admixing

|  | Composition Vol. % |
|---|---|
| Crude petroleum | 39.5 |
| Butyl Cellosolve | 0.9 |
| Alkyl aryl sulfonates |  |
| 490–510 mol. wt.[1] | 3.2 |
| 440–470 mol. wt.[1] | 3.5 |
| 330–350 mol. wt.[2] | 2.9 |
| Water containing 12,000 ppm monovalent salts | 50.0 |
| Ratio[3] | 4.7 |

[1]Approximately 62% sulfonates.
[2]Approximately 30% sulfonates.
[3]Ratio of the parts by volume of preferentially oil-soluble sulfonate per part of preferentially water-soluble sulfonate.

EXAMPLE 12

The compositions formed by admixing

|  | Composition Vol. % | | |
|---|---|---|---|
|  | 12A | 12B | 12C |
| Gasoline | 60.0 | 45.0 | 60.0 |
| Isopropyl alcohol | 5.0 | 4.0 | 5.0 |
| Alkyl aryl sulfonates |  |  |  |
| 440–470 mol. wt.[1] | 22.0 | 14.0 |  |
| 400–430 mol. wt.[1] |  |  | 22.0 |
| 300–400 mol. wt.[2] | 8.0 | 5.0 | 8.0 |
| Water | 5.0 | 32.0 | 5.0 |
| Ratio[3] | 5.8 | 5.7 | 5.8 |

[1]Approximately 62% sulfonates.
[2]Approximately 30% sulfonates.
[3]Ratio of the parts by volume of preferentially oil-soluble sulfonate per part of preferentially water-soluble sulfonate.

EXAMPLE 13

The compositions formed by admixing

|  | Composition Vol. % | | | |
|---|---|---|---|---|
|  | 13A | 13B | 13C | 13D |
| Crude petroleum | 45.0 | 58.0 | 80.0 | 90.0 |
| Butyl Cellosolve | 0.5 | 8.0 | 8.0 | 0.5 |
| Organic sulfonates |  |  |  |  |
| 400–550 Mol. Wt.[1] | 7.1 | 14.0 | 6.0 | 4.5 |
| 300–400 Mol. Wt.[2] | 7.4 | 16.0 | 6.0 | 5.0 |
| Water | 40.0 | 4.0 | — | — |
| Salt content[3], ppm | 12,000 | 5,000 | — | — |
| Ratio[4] | 2.0 | 1.8 | 2.1 | 1.9 |

[1]Approximately 62% sulfonates.
[2]Approximately 30% sulfonates.
[3]Salt content expressed as parts of salt per million parts of water.
[4]Ratio of the parts by volume of preferentially oil-soluble sulfonate per part of preferentially water-soluble sulfonate.

EXAMPLE 14

The compositions formed by admixing

|  | Composition Vol. % | |
|---|---|---|
|  | 14A | 14B |
| Crude petroleum | 68.8 | 68.8 |
| 1, 3-propylene glycol | 5.2 | — |
| Diethylene glycol hexyl ether | — | 5.2 |
| Organic sulfonates |  |  |
| 450–550 Avg. Mol. Wt.[1] | 14.0 | 14.0 |
| 300–400 Avg. Mol. Wt.[2] | 8.0 | 8.0 |
| Water | 4.0 | 4.0 |
| Ratio[3] | 3.6 | 3.6 |

[1]Approximately 62% sulfonates.
[2]Approximately 30% sulfonates.
[3]Ratio of the parts by volume of preferentially oil-soluble sulfonate per part of preferentially water-soluble sulfonate.

EXAMPLE 15

The composition formed by admixing

|  | Composition Vol. % |
|---|---|
| 39° API Illinois Crude Oil | 64.2 |
| Preferentially oil-soluble surface active sulfonates[1] | 17.0 |
| Preferentially water-soluble surface active sulfonates | 12.3 |
| n-Amyl alcohol | 6.5 |
| Ratio[3] | 2.8 |

[1]Contains 62% active sulfonates having an average molecular weight of 490–510.
[2]Contains 30% active sulfonates having an average molecular weight of 330–350.
[3]Ratio of the parts by volume of preferentially oil-soluble sulfonate per part of preferentially water-soluble sulfonate.

Stable low viscosity microemulsions are formed upon the addition of water containing about 5,000 ppm dissolved salts.

EXAMPLE 16

A soluble oil additive concentrate is prepared by admixing 57.0 volume percent Petronate CR, 20.3 volume percent of a preferentially water-soluble surface active alkyl aryl sulfonate marketed by the Sonneborn Division of Witco Chemical Company, Inc. under the trademark Pyronate 30, and 22.7 volume percent ethylene glycol monobutyl ether. The surface active alkyl aryl sulfonate and the ethylene glycol monobutyl ether are in the proportion of about 1.8 parts by volume of alkyl aryl sulfonate per part of ethylene glycol monobutyl ether. The preferentially oil-soluble and preferentially water-soluble alkyl aryl sulfonates are present in the proportion of about 2.8 parts of preferentially oil-soluble sulfonate per part of water-soluble sulfonate.

A soluble oil is prepared by admixing 100 parts of the additive concentrate prepared in the above step with 244 parts by volume of 39° API Illinois crude oil. The resulting composition is a soluble oil of the following composition:

|  | Composition Vol.% |
|---|---|
| Crude Oil | 70.9 |
| Preferentially oil-soluble alkyl aryl sulfonates[1] | 16.6 |
| Preferentially water-soluble alkyl aryl sulfonates[2] | 5.9 |
| Ethylene glycol monobutyl ether | 6.6 |

[1]Contains 62% active sulfonates
[2]Contains 30% active sulfonates

Water containing about 700 ppm dissolved salts is incrementally added to the soluble oil and the appearance and viscosity of the resulting microemulsions determined at each increment of water addition. These data reported in Table 5.

TABLE 5

| Water Added, Vol.% | Viscosity at 75° F., cp[1] | Emulsion Type | Appearance |
|---|---|---|---|
| 0 | 14.9 | w/o[2] | Clear |
| 7.4 | 20.5 | w/o | Clear |
| 13.8 | 22.4 | w/o | Clear |
| 28.6 | 22.8 | w/o | Clear |
| 31.0 | 22.0 | w/o | Clear |
| 35.3 | 21.8 | w/o | Clear |
| 39.4 | 21.6 | w/o | Clear |
| 42.9 | 21.8 | w/o | Clear |

TABLE 5-continued

| Water Added, Vol.% | Viscosity at 75° F., cp[1] | Emulsion Type | Appearance |
|---|---|---|---|
| 46.0 | 22.7 | w/o | Clear |
| 48.7 | 23.7 | w/o | Clear |
| 51.3 | 28.7 | w/o | Clear |
| 53.5 | 35.5 | w/o | Clear |
| 55.6 | 42.7 | w/o | Clear |
| 57.5 | 45.8 | — | Clear |
| 59.2 | 37.5 | o/w[3] | Clear |
| 61.6 | 19.0 | o/w | Clear |
| 65.0 | 9.2 | o/w | Clear |

[1]Measured with a Brookfield viscosimeter equipped with a UL adapter and operated at 6 rpm.
[2]Water-in-oil microemulsion.
[3]Oil-in-water microemulsion.

Various embodiments and modifications of this invention have been described in the foregoing description and examples, and further modifications will be apparent to those skilled in the art. Such modifications are included within the scope of this invention as defined by the following claims.

Having now described the invention, I claim:

1. An oil-external soluble oil composition comprising 35 to 90 volume percent of a liquid hydrocarbon selected from the group consisting of crude petroleum and liquid fractions thereof; 0.5 to 8 volume percent of a stabilizing agent selected from the group consisting of unsubstituted saturated monohydric aliphatic alcohols having 3 to 5 carbon atoms, unsubstituted saturated dihydric aliphatic alcohols having 3 carbon atoms, unsubstituted saturated aliphatic ketones having 4 to 6 carbon atoms, unsubstituted saturated glycol ethers having 4 to 12 carbon atoms, and dialkylene glycols having 6 carbon atoms; and 4 to 30 volume percent of surface active agents comprising both preferentially oil-soluble alkyl aryl sulfonates and preferentially water-soluble alkyl aryl sulfonates, said sulfonates being present in the proportion of about 1 to 15 parts of preferentially oil-soluble sulfonates per part of said preferentially water-soluble sulfonates; said soluble oil exhibiting a maximum viscosity upon the addition of water thereto not greater than about five times the viscosity of the soluble oil in a substantially anhydrous condition.

2. The composition defined in claim 1 wherein said preferentially oil-soluble alkyl aryl sulfonates are monosulfonates which in the form of their sodium salts have an average molecular weight above about 400, and wherein said preferentially water-soluble alkyl aryl sulfonates are monosulfonates or polysulfonates which in the form of their sodium salts have an average equivalent weight of less than about 400.

3. The composition defined in claim 1 wherein said liquid hydrocarbon is crude petroleum.

4. The composition defined in claim 3 wherein said preferentially oil-soluble alkyl aryl sulfonates are alkyl aryl monosulfonates which in the form of their sodium salts have an average molecular weight in the range of about 450 to 550.

5. The composition defined in claim 1 including water present in the form of a water-in-oil microemulsion.

6. The composition defined in claim 5 including up to about 15,000 parts by weight of a water-soluble salt of a monovalent metal per million parts by weight of water.

7. The composition defined in claim 5 wherein said water is present in an amount less than about 10 volume percent.

8. An oil-external solution oil comprising 35 to 90 volume percent of crude petroleum; 0.5 to 8 volume percent of a stabilizing agent selected from the group consisting of unsubstituted saturated monohydric aliphatic alcohols having 3 to 5 carbon atoms, unsubstituted saturated dihydric aliphatic alcohols having 3 carbon atoms, unsubstituted saturated aliphatic ketones having 4 to 6 carbon atoms, unsubstituted saturated glycol ethers having 4 to 12 carbon atoms, and dialkylene glycols having 6 carbon atoms; and 4 to 30 volume percent of surface active agents comprising both preferentially oil-soluble alkyl aryl monosulfonates having an average molecular weight in the range of about 450 to 550 and preferentially watersoluble alkyl aryl monosulfonates and polysulfonates having an average equivalent weight of less than about 400, said sulfonates being present in the proportion of about 1 to 12 parts of preferentially oil-soluble sulfonates per part of said preferentially water-soluble sulfonates; said soluble oil exhibiting a maximum viscosity upon the addition of water thereto not greater than about five times the viscosity of the soluble oil in a substantially anhydrous condition.

9. The soluble oil defined in claim 8 including water present in the form of a water-in-oil microemulsion.

10. The soluble oi defined in claim 9 including up to about 15,000 parts by weight of a water-soluble salt of a monovalent metal per million parts by weight of water.

11. The soluble oil defined in claim 9 wherein said water is present in an amount less than about 10 volume percent.

12. The soluble oil defined in claim 8 and including a light liquid hydrocarbon to reduce the viscosity of the soluble oil.

13. The soluble oil defined in claim 8 wherein said stabilizing agent is an unsubstituted saturated monohydric aliphatic alcohol having 3 to 5 carbon atoms.

14. The soluble oil defined in clai 8 wherein said stabilizing agent is an unsubstituted saturated dihydric aliphatic alcohol having 3 carbon atoms.

15. The soluble oil defined in claim 8 wherein said stabilizing agent is an unsubstituted saturated aliphatic ketone having 4 to 6 carbon atoms.

16. The soluble oil defined in claim 8 wherein said stabilizing agent is an unsubstituted saturated glycol ether having 4 to 12 carbon atoms.

17. The soluble oil defined in claim 8 wherein said stabilizing agent is a dialkylene glycol having 6 carbon atoms.

18. A soluble oil additive concentrate consisting essentially of an admixture of (1) preferentially oil-soluble surface active alkyl aryl monosulfonates having an average molecular weight above about 400 and preferentially water-soluble surface active alkyl aryl monosulfonates and polysulfonates having an average equivalent weight below about 400 in the proportion of about 1 to 12 parts of preferentially oil-soluble sulfonates per part of preferentially water-soluble sulfonates, and (2) a stabilizing agent selected from the group consisting of monohydric unsubstituted saturated aliphatic alcohols having 3 to 5 carbon atoms, unsubstituted saturated dihydric aliphatic alcohols having 3 carbon atoms, unsubstituted saturated aliphatic ketones having 4 to 6 carbon atoms, unsubstituted saturated glycol ethers having 4 to 12 carbon atoms, and dialkylene glycols having 6 carbon atoms in the proportion of about 2 to 7 parts by volume of said sulfonates per part of said stabilizing agent; said additive producing, upon admixture with a liquid hydrocarbon in the proportion of about 2 to 9 parts by volume of liquid hydrocarbon per part of additive, a soluble oil exhibiting a maximum viscosity upon the addition of water thereto not greater than about five times the viscosity of the soluble oil in a substantially anhydrous condition.

19. The concentrate defined in claim 18 wherein said preferentially oil-soluble sulfonates having an average molecular weight in the range of about 450 to 550.

20. The concentrate defined in claim 18 wherein said sulfonates are present in the proportion of about 1 to 4 parts by volume of said preferentially oil-soluble sulfonates per part of said preferentially water-soluble sulfonates.

21. The concentrate defined in claim 18 wherein said stabilizing agent is an unsubstituted saturated monohydric aliphatic alcohol having 3 to 5 carbon atoms.

22. The concentrate defined in claim 18 wherein said stabilizing agent is an unsubstituted saturated dihydric aliphatic alcohol having 3 carbon atoms.

23. The concentrate defined in claim 18 wherein said stabilizing agent is an unsubstituted saturated aliphatic ketone having 4 to 6 carbon atoms.

24. The concentrate defined in claim 18 wherein said stabilizing agent is an unsubstituted saturated glycol ether having 4 to 12 carbon atoms.

25. The concentrate defined in claim 18 wherein said stabilizing agent is a dialkylene glycol having 6 carbon atoms.

* * * * *